(12) United States Patent
Liberman et al.

(10) Patent No.: US 9,593,988 B1
(45) Date of Patent: Mar. 14, 2017

(54) SYSTEMS AND METHODS OF THERMAL ENERGY MEASUREMENT

(71) Applicant: Calmetrix, Inc., Arlington, MA (US)

(72) Inventors: Sergey Liberman, Waltham, MA (US); Stanislav Elektrov, Needham, MA (US); Paul Sandberg, Beverly, MA (US); Marc Zacharias, Arlington, MA (US)

(73) Assignee: Calmetrix, Inc., Arlington, MA (US)

( * ) Notice: Subject to any disclaimer, the term of this patent is extended or adjusted under 35 U.S.C. 154(b) by 369 days.

(21) Appl. No.: 14/219,056

(22) Filed: Mar. 19, 2014

Related U.S. Application Data

(60) Provisional application No. 61/857,678, filed on Jul. 23, 2013.

(51) Int. Cl.
*G01K 17/04* (2006.01)
*G01K 17/00* (2006.01)

(52) U.S. Cl.
CPC ............. *G01K 17/00* (2013.01); *G01K 17/04* (2013.01)

(58) Field of Classification Search
USPC .......................................................... 374/33
See application file for complete search history.

(56) References Cited

U.S. PATENT DOCUMENTS

| | | | |
|---|---|---|---|
| 3,665,762 A | 5/1972 | Domen | |
| 3,726,644 A | 4/1973 | Desnoyers et al. | |
| 3,813,937 A | 6/1974 | Fletcher et al. | |
| 3,841,155 A | 10/1974 | Keohler et al. | |
| 4,439,048 A | 3/1984 | Townsend et al. | |
| 4,963,499 A * | 10/1990 | Stockton | G01N 25/4846 165/263 |
| 4,993,842 A | 2/1991 | Morimoto et al. | |
| 5,547,282 A | 8/1996 | Pinhack et al. | |
| 5,702,185 A * | 12/1997 | Heikal | G01K 17/20 374/163 |
| 5,707,149 A | 1/1998 | Freire et al. | |

(Continued)

FOREIGN PATENT DOCUMENTS

| | | | |
|---|---|---|---|
| DE | 1533610 A2 * | 5/2005 | ............ G01K 17/00 |
| JP | 2006275713 A * | 10/2006 | |
| WO | WO2012003553 A1 | 1/2012 | |

*Primary Examiner* — Minh Phan
*Assistant Examiner* — Leon W Rhodes, Jr.
(74) *Attorney, Agent, or Firm* — John Brooks Law LLC; John J Brooks, III

(57) ABSTRACT

A thermal energy measurement system is disclosed for use as a calorimeter capable of providing sample thermal energy measurements in selectable modes including isothermal and/or adiabatic modes. In some embodiments, the thermal energy system further comprises a closed-loop servo controller. In some embodiments, the thermal energy measurement system is capable of providing thermal energy measurements in semi-adiabatic and/or custom programmed modes. In some embodiments, the servo controller may be implemented as a feedback circuit whose process variable is either heat flow, sample temperature, a combination thereof, or a preprogrammed time dependence of the heat flow and/or sample temperature. The output of the servo controller may be used to drive a temperature control device such as but not limited to a thermoelectric module (TEM). Methods of thermal energy measurement are also disclosed.

32 Claims, 7 Drawing Sheets

(56) References Cited

U.S. PATENT DOCUMENTS

| | | |
|---|---|---|
| 5,741,068 A | 4/1998 | Hemmerich et al. |
| 5,813,763 A | 9/1998 | Plotnikov et al. |
| 5,967,659 A | 10/1999 | Plotnikov et al. |
| 5,988,875 A | 11/1999 | Gershfeld et al. |
| 6,402,369 B1 * | 6/2002 | Ludington ......... G01N 25/4866 136/204 |
| 6,572,263 B1 | 6/2003 | Refalo et al. |
| 6,953,280 B2 | 10/2005 | Fischer et al. |
| 7,371,006 B2 * | 5/2008 | Schick ............... G01N 25/4866 374/10 |
| 7,677,795 B2 | 3/2010 | Schick |
| 7,712,956 B2 | 5/2010 | Richner et al. |
| 2010/0255588 A1 | 10/2010 | Schenker |
| 2011/0007775 A1 | 1/2011 | Wu |

* cited by examiner

A-A

SYSTEMS AND METHODS OF THERMAL ENERGY MEASUREMENT

CROSS-REFERENCE TO RELATED APPLICATIONS

This application claims the benefit of U.S. App. No. 61/857,678, filed on Jul. 23, 2013, entitled "HEAT FLOW AND TEMPERATURE MEASUREMENT SYSTEMS AND METHODS OF USE," the entire contents of which is incorporated herein by reference.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of the Invention

This invention relates to energy measuring systems and methods, in particular to systems and methods of measuring thermal energy as may be done in a calorimeter. In some embodiments the thermal energy measuring systems are able to switch between an adiabatic and an isothermal mode of operation.

2. Description of the Prior Art calorimeters are devices used to measure thermal energy in the form of heat either released or absorbed in the course of a chemical or physical process. Traditionally, calorimeters used in various industries, such as cement and concrete, food, bio sciences, rubber, polymers and heavy chemicals among others, belong to one of two types: isothermal or semi-adiabatic. In isothermal calorimeters, the temperature of the environment in which the sample is placed is maintained at an essentially constant value (e.g. within a fraction of a degree), while the amount of thermal power generated (or absorbed) by the sample is being measured as a function of time. Semi-adiabatic calorimeters use the opposite approach: thermal energy generated or absorbed by the sample is held within the sample, i.e. the heat exchange between the sample and the environment is held at a value close to zero, while the sample temperature is being measured as a function of time.

Both isothermal and semi-adiabatic calorimeters incorporate elements which are found in the vast majority of marketed devices. Isothermal calorimeters use a massive metal block utilized as a heat sink to stabilize the temperature in the environment around the sample. Semi-adiabatic calorimeters use a thick layer of thermal insulation to minimize thermal energy flow. Because of the considerable amount of insulation and other materials used with these calorimeters, they are typically large and bulky systems.

BRIEF SUMMARY OF THE INVENTION

The following summary is included only to introduce some concepts discussed in the Detailed Description below. This summary is not comprehensive and is not intended to delineate the scope of protectable subject matter, which is set forth by the claims presented at the end.

In one example embodiment, a compact thermal energy measurement system is provided capable for use as a calorimeter equipped with a temperature control device that allows sample measurements in different embodiments or selectable modes such as isothermal, adiabatic, semi-adiabatic, and/or custom programmed modes. In some embodiments, the temperature control device is controlled by an electrical servo controller implemented as a feedback circuit whose process variable is either heat flow, or sample temperature, a combination thereof, or preprogrammed time dependence of the heat flow and/or temperature. The output of the servo controller is used to drive a heating/cooling element such as but not limited to a thermoelectric module (TEM).

In some embodiments, the thermal energy measuring system comprises a sample container, an outer container, a heat flow sensor, a temperature sensor and a temperature control device.

In some embodiments, a thermal energy measuring system is provided comprising a sample container configured to retain a sample, the sample container having a sample container temperature, the sample container generally contained within an outer container, a means to measure a heat flow value between the sample container and the outer container, a means to measure a sample container temperature value and a means to heat the outer container to an outer container temperature value whereby the heat flow between the sample container and the outer container is a predetermined heat flow value or whereby the sample container temperature is heated to a predetermined temperature value.

In some embodiments, a thermal energy measuring system is provided comprising a sample container contained within an outer container, a heat flow sensor configured to measure a heat flow value between the sample container and the outer container, a temperature sensor configured to measure a sample container temperature value, a temperature control device configured to control a temperature of the outer container to an outer container temperature value whereby the temperature control device is capable of influencing the heat flow between the sample container and the outer container to a predetermined heat flow value and the temperature control device is configured to control a temperature of the outer container to an outer container temperature value whereby the temperature control device is capable of influencing the sample container temperature to a predetermined temperature value.

In some embodiments, the temperature control device is a thermoelectric module (TEM). In some embodiments, the temperature control device is a thermoelectric module (TEM) configured to control the temperature of the outer container to a higher temperature than a current temperature or to heat the outer container to a lower temperature than the current temperature. In some embodiments, the temperature control device is in contact with the outer container. In some embodiments, the temperature control device is configured to control the temperature of the outer container based on the predetermined heat flow value or the predetermined temperature value. In some embodiments, the temperature control device is a thermoelectric module (TEM) and the temperature control device is capable of being selectively influenced by a closed loop servo controller whereby the heat flow value is capable of being maintained at a setpoint and whereby the sample container temperature value is capable of being maintained at a second setpoint. In some embodiments, the temperature control device is capable of being influenced according to a predefined environmental temperature profile at the sample container, the closed loop servo controller is configured to input a magnitude of electrical current through the TEM and the magnitude of the electrical current representing the predefined environmental temperature profile defined by a control system using a predefined control algorithm. In some embodiments, the temperature control device is capable of being influenced according to a predefined environmental heat flow profile at the heat flow sensor, the closed loop servo controller is configured to input a magnitude of electrical current through the TEM and the magnitude of the electrical current representing the predefined environmental heat flow profile defined by a control system using a predefined control algorithm. In some embodiments, the heat flow sensor is embedded into a semi-insulating layer between the sample container and the outer container.

In some embodiments of the thermal energy measuring system, the temperature control device is a thermoelectric module (TEM) capable of being influenced by a closed loop servo controller wherein the heat flow value is a first process variable, the predetermined heat flow value is a first setpoint and the output current of the closed loop servo controller is the controller output whereby the heat flow value is capable of being maintained at the first set point and a sample temperature value is provided by the temperature sensor. In some embodiments, the temperature control device is also capable of being influenced by the closed loop servo controller wherein the sample container temperature value is a second process variable, the predetermined sample container temperature is a second setpoint and the output current of the closed loop servo controller is the controller output whereby the sample container temperature value is capable of being maintained at the second setpoint and the heat flow value is provided by the heat flow sensor.

In some embodiments of the thermal energy measuring system, the sample container and the outer container form generally open ended coaxial cylinders each having open ends, sidewalls, a common longitudinal axis and a radius; the sample container sidewalls and the outer container sidewalls comprise a highly thermally conductive material; the thermal energy measuring system further comprises a semi-insulating layer between the sample container sidewalls and the outer container sidewalls; the semi-insulating layer comprises a medium thermal conductivity material; and the open ends of the sample container sidewalls and the outer container sidewalls are covered with a thermally insulating bottom and a thermally insulating lid whereby the heat flow along the longitudinal axis of each of the containers is reduced, a sidewall temperature is constant along each of the container sidewalls coaxial with each of the containers and the heat flow occurs primarily in a radial direction perpendicular to the common longitudinal axis.

In some embodiments of the thermal energy measuring system, the sample container comprises a curved outer wall surrounding a top sample container sidewall and a bottom sample container sidewall; the outer container comprises a top outer container sidewall and a bottom outer container sidewall; the semi-insulating layer comprise a top semi-insulating disk positioned between the top sample container sidewall and the top outer container sidewall; the semi-insulating layer further comprises a bottom semi-insulating disk positioned between the bottom sample container sidewall and the top sample container sidewall; and an outside surface of the top and bottom outer container sidewalls and the curved surfaces of the sample container, semi-insulating layer and the outer container are terminated with thermally insulating material whereby heat flow along the radius of the sample container, the top and bottom semi-insulating layer and the top and bottom outer container is minimized and the temperature of the sample container sidewalls is constant along an imaginary cross-section of the sample container sidewalls perpendicular to a longitudinal axis and the heat flow primarily occurs in an axial direction of the sample container, the top and bottom semi-insulating layer and the top and bottom outer container.

In some embodiments, a method of measuring the temperature of a reaction, the method comprising selecting one of a first mode or second mode of operation for a thermal energy system. if the first mode of operation is selected, then determining the temperature of the reaction from a temperature value over a first time period utilizing a first closed loop process and if the second mode of operation is selected, then determining the temperature of the reaction from a heat flow value over a second time period utilizing a second closed loop process. In some embodiments, the first closed loop process comprises: (a) measuring a heat flow to determine the heat flow value as a first process variable, (b) comparing the first process variable to a first setpoint, (c) influencing a temperature control device whereby the first process variable complies with the first setpoint, (d) measuring a temperature to determine the temperature value, (e) iterating the steps of (a) through (d) over the first time period, and (f) determining the temperature of the reaction from the temperature value over the first time period. In some embodiments, the second closed loop process comprises: (g) measuring a temperature to determine a temperature value as a second process variable, (h) comparing the second process variable to a second setpoint, (i) influencing a temperature control device whereby the second process variable complies with the second setpoint, (j) measuring a heat flow to determine a heat flow value. (k) iterating the steps of (g) through (j) over the second time period, and (l) determining the temperature of the reaction from the heat flow value over the second time period.

Some embodiments of the thermal energy measurement systems and methods disclosed have thinner insulation layers than prior art system. These features are able to provide better measurement results and better precision in maintaining sample environmental conditions while measuring parameters of interest. This is because many samples to be measured lack sufficient symmetry and therefore heat flows and temperature may have complicated distributions in prior art systems.

Some embodiments of the thermal energy measurement systems and methods disclosed are also smaller and less bulky than prior art solutions. These features are able to provide solutions that use less laboratory space and have lower shipping costs when the systems are used at different locations. The smaller size also decreases the cost of raw material and manufacturing costs compared to prior art systems. Additionally, some embodiments disclosed may be simpler to market because semi-adiabatic calorimeters and isothermal calorimeters do not have to be marketed as two separate devices.

Other advantages and features of embodiments of the systems and methods disclosed will be apparent from the following description of embodiments and from the claims.

BRIEF DESCRIPTION OF THE SEVERAL VIEWS OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Systems and methods of thermal energy measurement use will now be described in detail with reference to the accompanying drawings. It will be appreciated that, while the following description focuses on systems and methods that function as a calorimeter for samples such as concrete, the systems and methods disclosed herein have wide applicability. Notwithstanding the specific example embodiments set forth below, all such variations and modifications that would be envisioned by one of ordinary skill in the art are intended to fall within the scope of this disclosure.

As used herein, the term "heat source", in addition to the definition used in the art of measuring thermal energy, shall mean either a heat source or a heat sink, depending on the direction of the heat flow.

As used herein, the term "to heat", in addition to the definition used in the art of measuring thermal energy, shall mean to heat or to cool, depending on the direction of the heat flow. For example, and not for limitation, "to heat" may mean to control the temperature of a container to a higher temperature than a current temperature or to heat the container to a lower temperature than the current temperature.

As used herein, the terms "thermal energy measurement systems and methods" shall mean any systems and/or methods that measure any component of thermal energy to include only measuring heat flow values or only measuring temperature values or measuring values for both heat flow and temperature.

One Embodiment of a Thermal Energy Measurement System

The proposed thermal energy measurement system aims to solve deficiencies in the prior art.

In one example embodiment, the thermal energy measurement system generally comprises a sample container having sidewalls configured to retain a sample, a temperature sensor, the sample container generally contained within an outer container, a heat flow sensor configured to measure a heat flow value between the sample container and the outer container and a temperature control device configured to control the temperature of the outer container. In some embodiments, the temperature control device influences the heat flow between the sample container and the outer container. In some embodiments, the temperature control device influences the temperature of the sample container or a sample container cavity.

Figure 1:
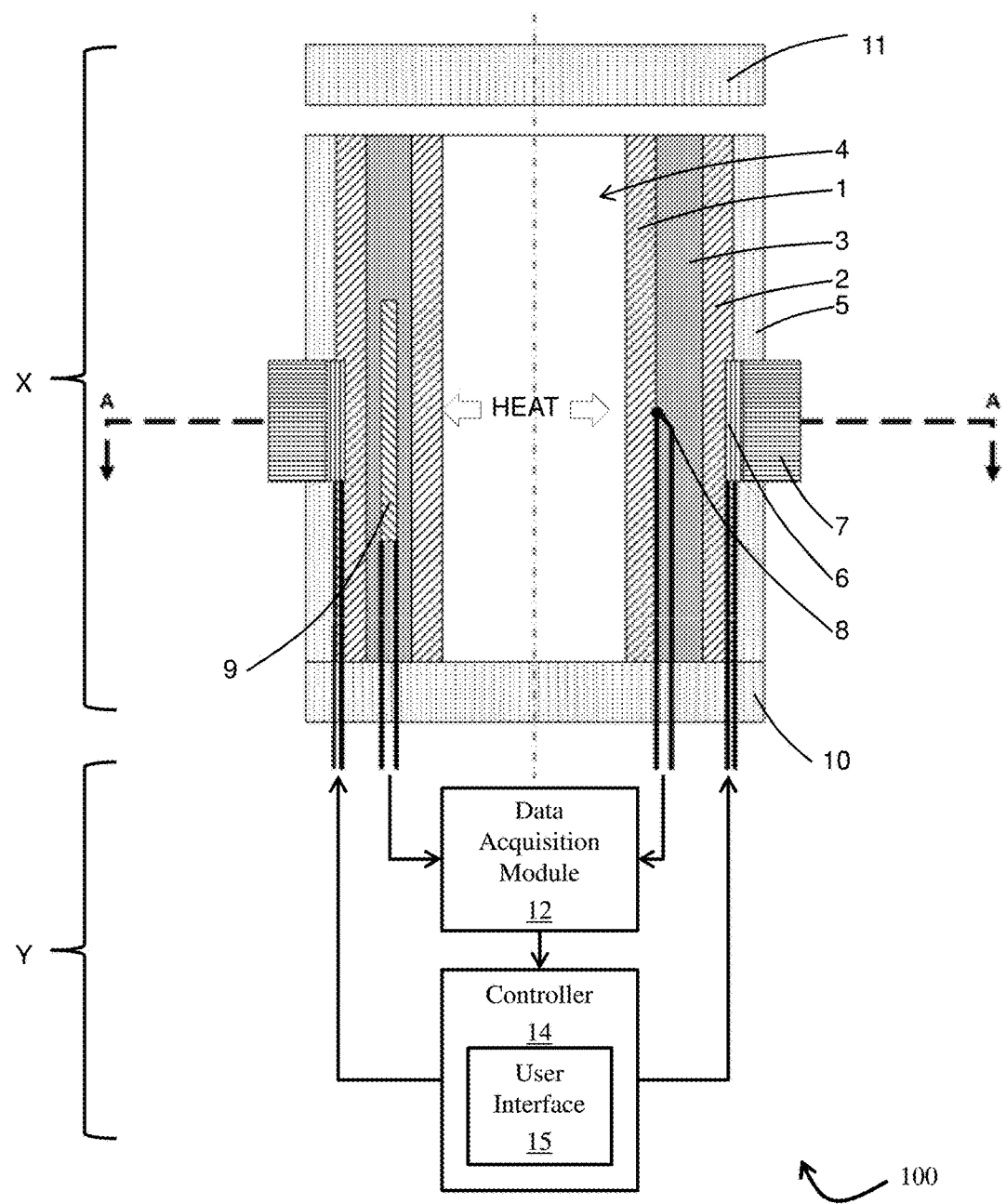
FIG. 1 illustrates a side cut-away view of one example embodiment of the thermal energy measuring system.

One example embodiment of the thermal energy measurement system is shown in FIG. 1. Here, the thermal energy measurement system 100 comprises sample container 1, outer container 2, means to measure a sample container 1 temperature value, means to measure a heat flow value and means to control the temperature of the outer container 2. In this example embodiment, the means to control the temperature of the outer container 2 also influences the sample container 1 temperature. In this example embodiment, the means to control the temperature may comprise a temperature control device 6 and the means to control the temperature may further comprise a closed-loop servo controller 14 whereby the heat flow value is capable of being maintained at a setpoint and whereby the sample container 1 temperature value is capable of being maintained at a second setpoint by the controller. FIG. 1 also illustrates an embodiment further comprising a semi-insulating layer 3, one end 4 of the sample container 1 defining an opening to receive a cup with the sample (cup and sample not shown), outer insulation 5, heat sink 7, a thermally insulating bottom 10 and a thermally insulating removable lid 11. In this embodiment, the sample container 1 and the outer container 2 are shaped such that they form generally open ended coaxial cylinders each having open ends defined by the container sidewalls.

Referring to FIG. 1, sample container 1 is generally a thin-walled thermally conductive container with an inner sample container cavity configured to receive and retain a sample. As shown, the sample container 1 may be shaped to receive a sample or the sample may also be received in a cup to be put into the sample container for easier handling (cup and sample not shown). The sample container 1 may be defined by sample container sidewalls made from any thermally conductive material such as, but not limited to aluminum. The sample container 1 has a sample container temperature and the sample container sidewalls are configured such that they will retain the sample and transfer thermal energy, typically heat, from the sample container cavity and the sample container sidewalls to the outer container sidewalls. As shown, the sidewalls are configured to transfer thermal energy from an inner surface of the container sidewalls to an outer surface of the container sidewalls. In some embodiments, the sample container 1 is made from a highly thermally conductive material. Examples of a suitable highly thermally conductive material may include, but are not limited to, materials having a thermal conductivity of 200 watts per meter per Kelvin (W/(m-K)) or higher such as aluminum (220 W/(m-K)), copper (390 W/(m-K)), gold or silver.

Means to measure a sample container temperature value may comprise any device of method capable of measuring and communicating a value or representation of the value of the temperature of the inside of the sample container or of the sidewalls of the sample container. For example, the means to measure a sample container temperature value may comprise one or more thermostats, thermocouples, thermometers or any other means of measuring and communicating a temperature. In the embodiment of FIG. 1, the means to measure a sample container temperature value comprises temperature sensor 8. In the embodiment of FIG. 1, the temperature sensor 8 is a thermocouple in thermal contact with sample container 1 with electrical leads going to a data acquisition module (DAQ) 12 to communicate the temperature value.

Referring again to FIG. 1, one end of the sample container 1, as shown the top end 4 of the sample container 1 is open to receive the cup with the sample (cup and sample not shown). Another end of the sample container, here the bottom end of the sample container may be defined by a sample container bottom wall to enclose the bottom of the sample container cavity. The sample container bottom end may also be left open and the bottom of the sample container cavity may be enclosed by other materials or elements of the system.

Outer container 2 of the thermal energy measuring system is also a generally thermally conductive container with an inner container cavity configured to contain the sample container and a semi-insulating layer. Similar to the sample container 1, the outer container 2 may be defined by outer container sidewalls made from any thermally conductive material such as, but not limited to aluminum. The sidewalls are configured such that they will contain the sample container 1 and the semi-insulating layer 3 and also transfer heat from the sample container 1 to the environment of the thermal energy measuring system. A shown, the outer container sidewalls are configure such that thermal energy can be transferred from the sample container 1 to an inner surface of the outer container sidewalls to an outer surface of the outer container sidewalls and to the environment. The outer container 2 may or may not be integrated with an outer container top wall or an outer container bottom wall. In some embodiments, the outer container is made from a highly thermally conductive material.

Generally, in some embodiments, the positioning and configuration of the sample container and the outer container are such that thermal energy can be transferred between the containers. In preferred embodiments, the relationship between the two containers is consistent so that thermal energy transfer and temperature values are uniform along the sidewalls of the containers. In the embodiment shown, the relationship between the two containers is one where the sidewalls have a uniform space between them in a radial direction from a common longitudinal axis of the containers. In other embodiments, the space between the two containers may be altered by material composition while still maintaining the same uniformity of thermal energy transfer. The space and/or the materials between the two containers is such that the temperature value of the outer container is capable of influencing the heat flow between the sample container and the outer container to a predetermined heat flow value as well as being capable of influencing the heat flow between the sample container and the outer container so that the sample container temperature value can be maintained at a predetermined temperature value.

Means to measure a heat flow value between the sample container and the outer container may comprise any device or method of measuring and communicating a heat flow value. For example, means to measure a heat flow value may comprise elements such as but not limited to one or more heat flow sensors, thermopiles. In this example embodiment, the means to measure a heat flow value is a heat flow sensor 9 comprising a thermopile with electrical leads in communication with the DAQ. The heat flow sensor 9 is capable of providing input to a controller as well as providing input other components of the thermal energy measuring system such as a user interface or converter. In some embodiments, the heat flow sensor may comprise pairs of thermocouples connected in thermopile arrangement with odd-numbered thermocouples in thermal contact with the sample container and even-numbered thermocouples in thermal contact with the outer container. In some embodiments, the heat flow sensor or its insulating layer is selected such that its thermal conductivity is close to that of the semi-insulating layer so as to preserve uniformity of the heat flow across the semi-insulating layer and the heat flow sensor.

Between the sample container and the outer container is a semi-insulating layer 3. The semi-insulating layer comprises a layer of material that has a thermal conductivity lower than that of the sample container and outer container and provides a distance between the two containers sufficient to measure the heat flow between them. The semi-insulating layer may comprise a gap between the two containers filled with air or it may be a layer of semi-insulating material such as polyurethane. The thickness and material of the semi-insulating layer are chosen to be such that the layer is as thermally conductive as possible, so long as the sensitivity of the heat flow sensor embedded in it is sufficiently high for the specific measurements for which the calorimeter is designed. In some embodiments, the semi-insulating layer is not too insulating or too thick but defines a gap between the two containers sized only to provide enough of a temperature drop across the heat flow sensor so that it sensor generates detectable signal. The material for the semi-insulating layer material may be a medium thermally conductive material. In some embodiments, the semi-insulating layer is made from a medium whose thermal conductivity matches that of the heat flow sensor overall or the medium/substrate of the heat flow sensor. The semi-insulating layer need not be a good thermal insulator. For illustration purposes and not for limitation, examples of suitable material for the semi-insulating layer may comprise, a custom built heat flow sensor build to match the thermal conductivity of a polymer as the semi-insulating layer (thermal conductivity on the order of 0.1 W/m/K). In another illustrative example, an off-the-shelf heat flow sensor, such as a thermopile sold by Omega, uses a polyimide film as the substrate and its thermal conductivity is 0.5 W/m/K which would be used to match the thermal conductivity properties of the semi-insulating material. With this illustrative example, if polyimide was used as the semi-insulating layer and as the substrate of the heat flow sensor, this is expected to result in a thickness of the semi-insulating layer between the sample container and outer container of about 1 or 2 mm.

Means to vary the temperature of the outer container comprises any device or method of controllably varying the temperature of the outer container. For example, means to vary the temperature of the outer container may comprise one or more heater, cooler, thermoelectric heater/cooler, thermoelectric module (TEM), single stage or multi-stage Peltier elements, water bath, oil bath, temperature-controlled air flow. In embodiments, the means to vary the temperature of the outer container comprises a temperature control device 6 configured to control the temperature of the outer container to an outer container temperature value which in turn influences the heat flow between the two containers and also influences the sample container temperature. In these embodiments, the temperature control device is capable of influencing the heat flow between the sample container and the outer container to a predetermined heat flow value as well as is capable of influencing the sample container temperature to a predetermined temperature value. As shown, the temperature control device 6 comprises a thermoelectric module (TEM, Peltier element) with electrical leads going to a controller whereby the controller is capable of controlling the temperature control device 6. Also shown in FIG. 1 is a TEM heat sink 7 which is configured to transfer thermal energy from the thermal energy measurement system, here from the outer container sidewalls, to the environment.

In embodiments where the temperature control device is a TEM, the temperature of the sample container cavity or the heat flow from the sample container to the outer container is controlled by way of the controller that increases or decreases the temperature of the outer container, which in turn influences the sample container temperature to a predefined temperature value or heat flow value. The increase or decrease in the temperature of the outer container is accomplished by either delivering heat to or removing heat from the outer container with the TEM. The delivery or removal of heat is accomplished by passing an electrical current through the TEM, with the said current being determined by the controller output. Due to its intrinsic properties, the TEM then produces a heat flow from one of its two surfaces to the other. Direction of the current determines the direction of this heat flow, and the magnitude of the electrical current determines the amount of heat flow the TEM produces. One of the TEM surfaces is in thermal contact with the outer environment (for example, but not limited to, room air), thus maintaining a relatively constant temperature since the outer environment is voluminous enough not to be affected significantly by the TEM. The other surface of the TEM is in thermal contact with the outer container. Thus the TEM provides controlled temperature differences between the outer environment and the outer container through the controlled heat flow through its body and the TEM is thus able to control the temperature of the outer container. The controller output, or instructions from the controller, may transition smoothly between negative and positive values, depending on the requirements of the servo system.

The DAQ may comprise any device capable of communicating with and receiving data from the means to measure the heat flow and the means to measure the temperatures values. For example, the DAQ may comprise an analog-to-digital converter connected to a computer, an analog-to-digital converter embedded in the closed loop controller or a circuit that converts temperature or heat flow to voltage and conditions it to serve as a process variable for an analog closed-loop controller. The DAQ may also communicate the input from the heat flow and temperature sensors to the controller and to a system user interface. A data acquisition device/module may also be provided for receiving and providing system variables of interest such as the thermal energy measures. The DAQ may be a stand-alone data logger and/or a data acquisition module that continuously communicates with an external computer, so that data is being saved and processed on the computer. For example, in one embodiment, the DAQ is an off-the-shelf voltage measurement module with a USB interface.

As shown in FIG. 1, the thermal energy measurement system 100 may also be coupled to the controller 14 to control the temperature control device. The controller 14 may be any device or method of controlling the temperature control device. For example, the controller 14 may be a processor based device. In some embodiments, the controller 14 may be a microcontroller or a general purpose computer in communication with and configured to function as a closed-loop (servo) controller of the temperature control device. In some embodiments, the controller 14 as a closed-loop controller is configured to define or receive a setpoint, receive process variables and determine a control output such as instructions to control the current flowing through the TEM. For example, in one example embodiment, the controller 14 is an off-the-shelf proportional-integral-derivative (PID) controller with a serial interface to the computer.

A control algorithm is used to determine the control output. The control algorithm performs the calculations enabling the controller to perform the server-controller methods. In general, the algorithm comprises two input variables known as a process variable and a setpoint, an output known as control output, and a means to compute the control output based on the setpoint, and current and historic values of the process variable, so as to make the process variable track the setpoint as closely as possible. While various control algorithms can be used in this application, one example of a control algorithm is a PID control algorithm which is well-known to those skilled in the art.

In some embodiments, the DAQ may be integrated with the controller.

The controller is also capable of switching between modes of operation. In these embodiments, the control algorithm is capable of being used by the thermal energy measurement system when it operates in either the adiabatic mode or the isothermal mode. This is accomplished, as described below, by altering the variables used as the process variables and the setpoints. The altering of the variables can be selected at a user interface which may alter the setpoint for the servo system and alter the sensors used to provide process variables to the servo system. The user interface may comprise any interface that allows the user to select a mode of operation. Suitable user interfaces include but are not limited to graphic user interfaces, touch screens, toggles, switches, buttons, keyboards or a computer mouse.

Figure 2A:
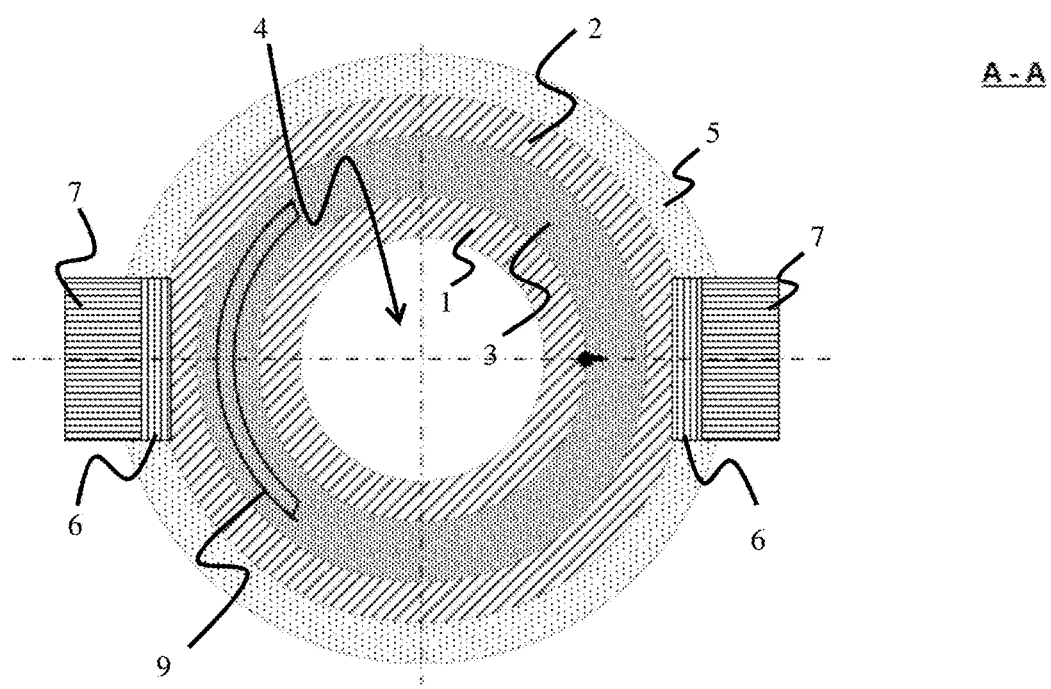
FIG. 2A illustrates a top cut-away view of the embodiment of FIG. 1 at section A-A.
Figure 2B:
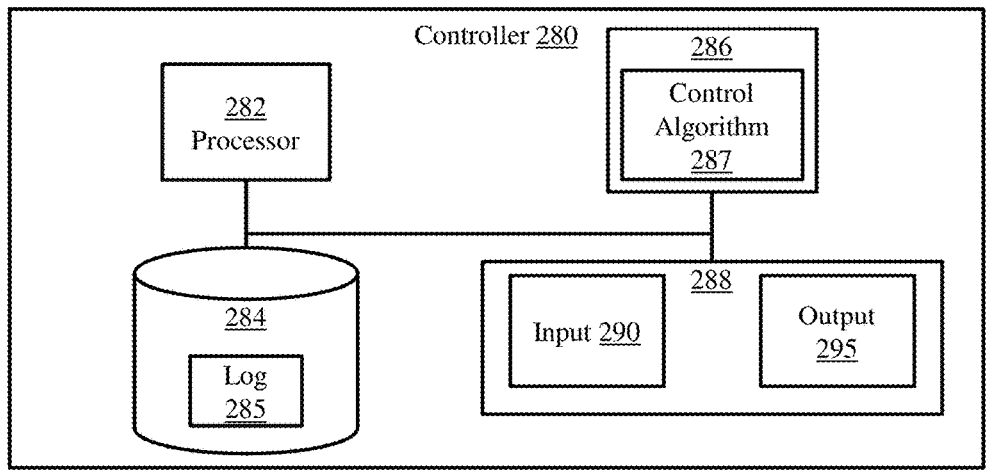
FIG. 2B illustrates a functional diagram of one example embodiment of a controller.
Figure 2C:
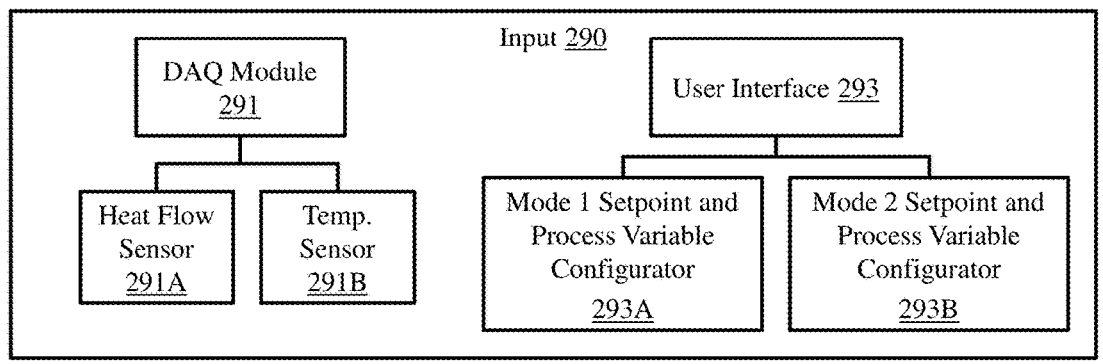
FIG. 2C illustrates a function diagram of an example of input to one embodiment of the controller.
Figure 2D:
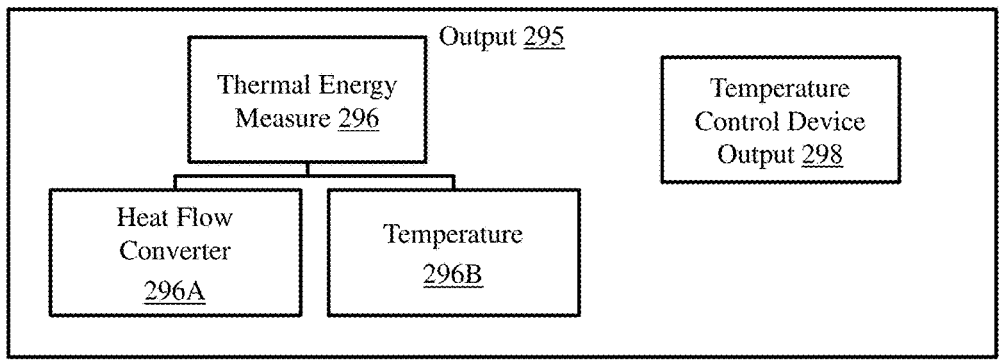
FIG. 2D illustrates a functional diagram of an example of output from one embodiment of the controller.

One example embodiment of a controller is shown functionally in FIG. 2B. As shown, the controller 280 may comprises a processor 282 configured to execute a control algorithm 287 in memory 286 based on input 290 from an input/output device 288 and provide an output 295. The controller may communicate with common input/output devices. For example, as shown in FIG. 2C, the controller may receive input 290 from a user interface 293 which may include the ability to configure a setpoint and process variable for a Mode 1 at 293A and a Mode 2 at 293B. The controller may also receive input 290 from a DAQ which may include data from the heat flow sensor 291A or the temperature sensor 291B. For example, the user interface 293 may allow the user to select whether the thermal energy measurement system will operate in the adiabatic mode or in the isothermal mode. In some embodiments, the input 295 and the output 291 are matched based on the relationships of the process variable and the setpoint according to the techniques of servo systems. The controller may also, as shown in FIG. 2D, provide output of a thermal energy measure 296 and/or an output to control the temperature control device 298. The thermal energy measure may be provided by converting heat flow values at 296A or by providing temperature values at 296B. The user interface 293 may be configured to allow a user to modify the output 295 from the control algorithm 287 and/or modify the input 290 to the control algorithm 287. In some embodiments, the controller also supplies the electric current required for the system elements. In some embodiments, the controller may incorporate other system elements such as the DAQ and/or the DAQ log/logger.

Referring to FIG. 1, in some embodiments, the thermal energy measurement system 100 further comprises outer insulation 5 insulating the outer container and its contents. The outer insulation 5 is generally any type of insulating material and is used to improve the temperature uniformity of outer container 2 and to insulate it from any surrounding medium.

Referring to FIG. 1, embodiments of the thermal energy measurement system 100 may also have a thermally insulating bottom 10 which is used to minimize the heat flow through the bottom 10 and promote heat flow through the sample container and outer container sidewalls. Embodiments of the thermal energy measurement system may also have a removable thermally insulating lid 11. The removable lid 11 is used to provide access to the sample container cavity when it is removed and when it is place over the open end of the sample container, it functions similar to the bottom 10 to minimize the heat flow through the lid 11 and promote heat flow through the sample container and outer container sidewalls. The bottom 10 and lid 11 may be made with any suitable insulating material such as but not limited to polyurethane foam, polysterene or any other known insulating material.

The thermal energy measurement system may be configured a single unit with a single cavity without the need for both a sample and reference container as with a differential calorimeter.

In the illustrative embodiment of FIG. 1, the thermal energy measurement system 100 has a cylindrical shape. FIG. 2A illustrates a top view of the embodiment of FIG. 1 at cut-away section A-A. FIG. 2A illustrates one embodiment of the sample container 1, outer container 2, the semi-insulating layer 3, temperature control device 6, heat-sink 7 and heat-flow sensor 9.

In one example embodiment, the height of the thermal energy measurement system 100 along its longitudinal axis is generally greater than its diameter. As shown in FIGS. 1 and 2A, the height may be greater than its width so that the area of the cylindrical surface is greater than the combined areas of its ends. For example, the height may be several times greater (for example, 5 times) than its width so that the area of the cylindrical surface is at least several times (in this example, 10 times) greater than the combined areas of its ends. In these embodiments, the sample is placed in the sample container 1 which is made of thermally conductive material (e.g., aluminum) and has a low thermal capacity. The outer container 2 with low thermal capacity is positioned coaxially to the sample container 1 with a narrow gap between the sidewalls of the containers. This gap may be filled with material which has a lower thermal conductivity than the sample container 1 and the outer container 2, (e.g., polyurethane), thus forming another semi-insulating layer 3. The open ends and edges of the sample container 1, outer container 2 and the semi-insulating layer 3 are thermally insulated with the bottom 10 and lid 11. The temperature sensor 8 is positioned in thermal contact with the sidewalls of sample container 1. The heat flow sensor 9 (e.g., a thermopile) is implemented in semi-insulating layer 3, or in another embodiment, the separation layer of the thermopile comprises the semi-insulating layer 3. The temperature control device 6, such as a Peltier element, a thermoelectric heater/cooler or TEM is affixed to the sidewalls of the outer container 2 so that one side of the temperature control device 6 is in thermal contact with the surface of outer container 2 and the other side of the temperature control device 6 is equipped with a heat sink 7 for heat exchange with the surrounding medium (e.g., air, or any fluid).

The cylindrical nature of this embodiment's design, the fact that the two edges of the containers are thermally insulated, and the fact that their surface areas are small compared to the area of the container surfaces mean that the heat flow along the axis of the cylindrical structure is negligible at all times and that the temperature distribution and heat flow in the sample are functions of time and radius of the containers as the sole spatial coordinate. This means that the sidewall temperature measured at one point of the sample container 1 is generally the same for the whole surface of 1 and that heat flows radially in layer 3, thereby making it sufficient to measure the heat flow at one location of layer 3 in order to calculate the total thermal power produced (or consumed) by the sample. This addresses one deficiency of existing calorimeter designs that have a problem maintaining sample environmental conditions while measuring parameters because some samples lack sufficient symmetry and therefore heat flows and temperature profiles may have complicated distributions. For example, consider an existing calorimeter design with a sample that is not symmetrical with respect to the surface that has heat flow sensor implemented on it. With existing calorimeter designs, it is difficult to compute the total heat flow from just the measurements on the heat flow sensor; you have to rely heavily on calibration. Meanwhile the embodiments disclosed may eliminate the heat flow through the lid and bottom of the cylinder (see FIG. 1) and with the design of the sample container which more uniformly distributes the heat from any sample these embodiments may make the heat flow density through the sample container and the semi-insulating layer more uniform. These embodiments may calculate the total heat flow as what is measured by the heat flow sensor, divided by the sensor area and multiplied by the area of the side wall. Although the solutions described herein may also use some form of calibration, it is expected to be less critical than with other existing solutions.

The uniformity of heat flow across embodiments may also be enhanced when the semi-insulating layer is made from a medium whose thermal conductivity matches that of the insulating layer of the heat flow sensor. This specific matching of thermal conductivity may increase uniformity of the heat flow across the semi-insulating layer and the heat flow sensor and reduce distortion of the heat flow caused by a different in thermal conductivity between the semi-insulating layer and the heat flow sensor.

This embodiment of FIG. 1 also includes a controller for closed-loop (servo) control of the current flowing through the TEM. This embodiment also comprises a DAQ for receiving data from the temperature and heat flow sensors. The controller is in communication with and receives data from the DAQ. This data may be used as input, such as process variables, for the controller and may also be used to provide the thermal energy measures (system measures) directly or the data used to determine the thermal energy measure. The DAQ may be a stand-alone data logger and/or a data acquisition module that continuously communicates with the controller for processing and so that data is being saved and processed on the controller.

Embodiments in Isothermal Mode

The thermal energy measurement system may be configured to selectively operate in an isothermal mode of operation as one of a plurality of modes of operation. It is understood that embodiments of the thermal energy measurement system may also be configured to only operate in an isothermal mode of operation.

In an isothermal mode of operation, generally the temperature of the environment surrounding the sample is maintained constant and the thermal energy generated or absorbed by the sample is measured. This mode of operation is achieved by the temperature control device being capable of being selectively influenced by the closed-loop servo controller the whereby the sample container temperature value is capable of being maintained at a setpoint. For example, the TEM may operate in a closed loop (servo) mode in which the temperature measured by a temperature sensor affixed to the sample container is the process variable, while the desired temperature value is the setpoint, and the output current of the controller is the controller output. The thermal energy is derived from the system measures from the heat flow sensor.

In the isothermal mode of operation, the control algorithm uses the setpoint temperature as the setpoint, the sample temperature as the process variable and the control output of the algorithm is the magnitude of electrical current that is to be delivered to the heating/cooling module, e.g. TEM.

In another embodiment of operating in an isothermal mode, the setpoint temperature may not be constant. For these embodiments, the setpoint may follow a preprogrammed time profile or it can be adjusted automatically in real time by mirroring temperature conditions in an outside environment, such as temperature measured at a different geographical location, where the system and its temperature control system are connected to a communication channel such as the internet or a cellular phone network used to convey external temperature data to the control system. For example, the temperature control device (TEM) may be capable of being influenced according to a predefined environmental temperature profile at the sample container, the closed loop servo controller is configured to input a magnitude of electrical current through the TEM and the magnitude of the electrical current representing the predefined environmental temperature profile defined by a control system using a control algorithm. As an illustrative example, the setpoint temperature can be the temperature measured at a construction site once per minute and sent to the controller over the internet with less than 1-minute delay. In another example embodiment, the setpoint temperature may be a predefined environmental temperature profile such as would reflect an expected outdoor temperature profile over a particular time period of a particular time of year.

Embodiments in Adiabatic Mode

The thermal energy measurement system may be configured to selectively operate in an adiabatic mode of operation as one of a plurality of modes of operation. It is understood that embodiments of the thermal energy measurement system may also be configured to only operate in an adiabatic mode of operation.

The adiabatic mode of operation, in which the thermal energy generated or absorbed by the sample is contained within the sample and the temperature of the sample is measured as a function of time, is achieved by the temperature control device being capable of being selectively influenced by the closed loop servo controller whereby the heat flow value is capable of being maintained at a setpoint. For example, in the adiabatic mode of operation, the TEM operates in a closed loop (servo) mode in which the heat flow measured by the heat flow sensor is the process variable, the value of zero (no heat flow) is the setpoint, and the output current of the controller is the controller output. The sample temperature is measured by the temperature sensor affixed to cylinder 1.

In the adiabatic mode of operation, the control algorithm uses zero as the setpoint, the measured heat flow as the process variable and the control output of the algorithm is the magnitude of electrical current that is to be delivered to the heating/cooling module, e.g. TEM. In another embodiment of operating in the adiabatic mode, the setpoint heat flow value may differ from zero (a semi-adiabatic mode of operation) or it can follow a preprogrammed time profile, or it can mirror some external parameter fed into the servo system as described above. For example, the temperature control device (TEM) may be capable of being influenced according to a predefined environmental heat flow profile at the heat flow sensor, the closed loop servo controller is configured to input a magnitude of electrical current through the TEM and the magnitude of the electrical current representing the predefined environmental heat flow profile defined by a control system using a control algorithm. As an illustrative example, the setpoint can be the heat flow through an outer wall of a structure inside of which a concrete is poured, measured at a construction site once per minute and sent to the controller over the internet with less than 1-minute delay. In another example embodiment, the setpoint heat flow may be a predefined environmental heat flow profile such as would reflect an expected insulation environment over a particular time period.

Embodiments Enabling Both Adiabatic and Isothermal Mode

The thermal energy measurement system may be configured to selectively operate in either a first adiabatic mode or a second isothermal mode of operation as two of a plurality of modes of operation. The choice of the mode of operation can be made using a user interface such as a software or hardware switch.

The ability to switch between modes is achieved by the servo system which enables active regulation of either temperature values or heat flow values with the ability to determine and provide a suitable control output which keeps the system in a desired state consistent with the defined setpoint. With the physical embodiments disclosed, this is done without the use of massive metal blocks used in legacy isothermal calorimeters or large amounts of thermal insulation used in adiabatic calorimeters.

These embodiments are different from differential calorimeters such as those disclosed in U.S. Pat. No. 5,967,659, filed Sep. 16, 1998 to Valerian V. Plotnikov which is herein incorporated by reference in its entirety. Example embodiments disclosed herein do not need a reference cell and are capable of operating in an isothermal mode.

These embodiments are different from calorimeters that have separate heating and cooling elements such as those disclosed in U.S. Pub. No. 20100255588, filed Apr. 26, 2010 to Benedikt Schenker which is herein incorporated by reference in its entirety. In example embodiments disclosed herein, the temperature control device when operating with a controller is capable of operating as both the heating and cooling element and some embodiments can operate in either an isothermal and/or and adiabatic mode.

Additionally, since embodiments may be switched between modes, multiple devices are not needed to be used in a lab or to be deployed to the field.

Another Example Embodiment

Figure 3:
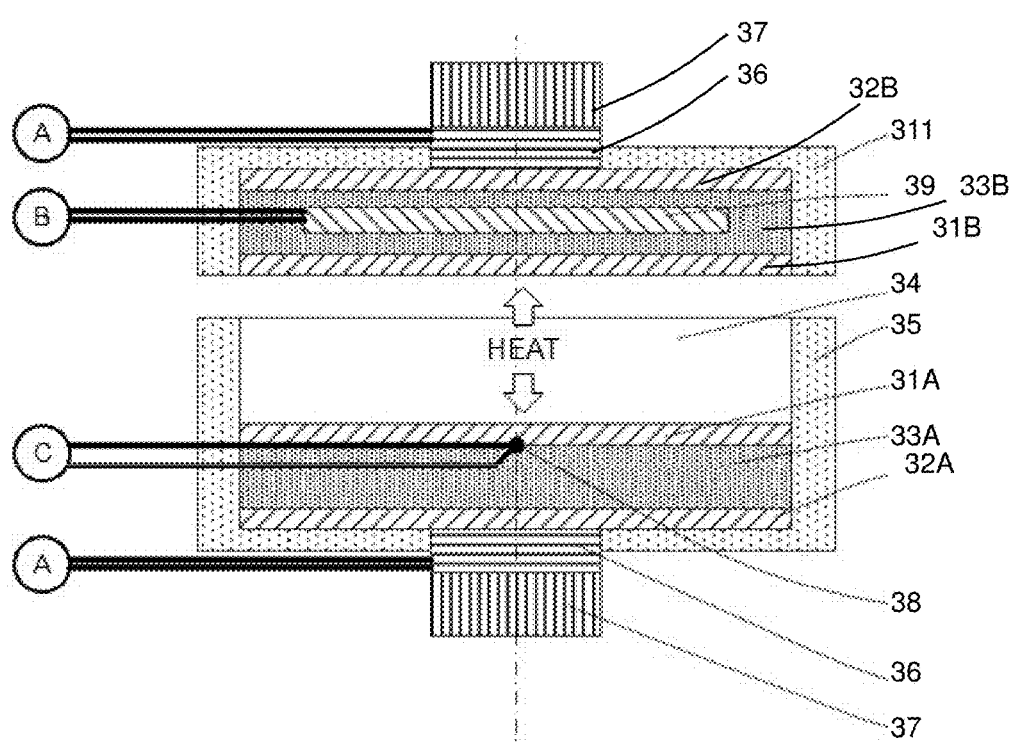
FIG. 3 illustrates a side cut-away view of one example embodiment of a disk-shaped thermal energy measuring system.

Another example embodiment of the thermal energy measurement system is shown in FIG. 3. FIG. 3 is a cut-away side view of this embodiment. This example embodiment illustrates sample container comprising two generally planar sidewalls 31A and 31B and a curved outer wall (here defined by outer insulation 35) configured to contain a cup with a sample (cup and sample not shown), an outer container comprising two outer generally planar sidewalls 32A and 32B, a semi-insulating layer 33A and 33B, an open end 34 of the sample container to receive the cup with the sample (cup and sample not shown), outer insulation 35, at least one temperature control device 36, a heat sink 37, a temperature sensor 38, a DAQ and a heat flow sensor 39. As shown, the top portions of the system, elements 31B, 33B, 39, 32B as well as the temperature control device 36 and heat sink 37 associated with these components, are removable together to function as a removable lid. Insulation 311 insulates the curved outer wall and top of these components without insulating the temperature control device 36 or heat sink 37. The thermal energy measurement system may be in communication with the DAQ and controller as illustrated with callouts A, B and C and the DAQ is in communication with a controller similar to those described with respect to FIG. 1 and as otherwise described herein. In this example embodiment, the sample container comprises two inner thermally conductive generally planar sidewalls (e.g. aluminum disks), here a bottom sample container sidewall 31A and a top sample container sidewall 31B and a curved wall (defined by inner surface of outer insulation 35) configured to define a sample container cavity to contain a cup with a sample (cup and sample not shown). The curved wall is defined by the outer insulation 35. The outer container comprises two outer thermally conductive generally planar sidewalls, here a bottom outer container sidewall 32A and a top outer container sidewall 32B. The semi-insulating layer comprises two semi-insulating layers (e.g. polyurethane), here a bottom semi-insulating disk 33A and a top semi-insulating disk 33B. The open end 34 of the sample container is configured to receive the cup with the sample (cup and sample not shown). The outer insulation 35 forms the curved walls for portions of the sample container, and insulates the outer container and the semi-insulating layer (for improved temperature uniformity of outer container 32 and to insulate it from surrounding medium). The temperature control device 36, as shown a TEM, in communication with the controller at A. The TEM heat sink 37. The temperature sensor 38, as shown may be in thermal contact with sample container 31. As shown, the temperature sensor 38 is a thermocouple in communication with the DAQ at C. The heat flow sensor 39, as shown a thermopile in communication with the DAQ at B. The thermally insulating portion 311 of the thermally insulating removable lid forms the curved walls for other portions of the sample container and insulates the outer container and the semi-insulating layer.

In the disk-shaped embodiment of FIG. 3, the diameter of the cylindrical sample is greater than its height and the cylindrical sample is thermally insulated along its curved surface while the TEM assemblies are attached to the container ends. As shown, the outside surface of the top (32B) and bottom outer container sidewalls (32A) and the curved surfaces of each of the sample container (edges of 31A and 31B), semi-insulating layer (edges of 33A and 33B) and the outer container (edges of 32A and 32B) are terminated with thermally insulating material 35. In an example embodiment, the diameter of the cylindrical sample is at least several times greater than its height and the cylindrical sample is thermally insulated along its curved surface, while the TEM assemblies are attached to the container ends. The thermal energy measurement system operation of this embodiment is similar to that of the design described above. The main difference is that in this embodiment, heat flow along the radius of the sample container, the top and bottom semi-insulating layer and the top and bottom outer container is minimized and the temperature of the sample container sidewalls is constant along an imaginary cross-section of the sample container sidewalls perpendicular to a longitudinal axis and that the heat flow primarily occurs in an axial direction of the sample container, the top and bottom semi-insulating layer and the top and bottom outer container. In other words, the heat flow along the radius of the containers is minimized or eliminated and the temperature distribution and heat flow in the sample are now functions of time and the longitudinal axis of the container as the only one spatial coordinate.

In both example embodiments, thermal insulation for container ends (FIG. 1) or the container's curved surface (FIG. 3) can be implemented by use of materials known as good thermal insulators or alternatively by another closed-loop TEM-based system, similar to the one described above, operating in adiabatic mode (target heat flow value set to zero).

One Embodiment of the Thermal Energy Measuring System in Operation

Figure 4:
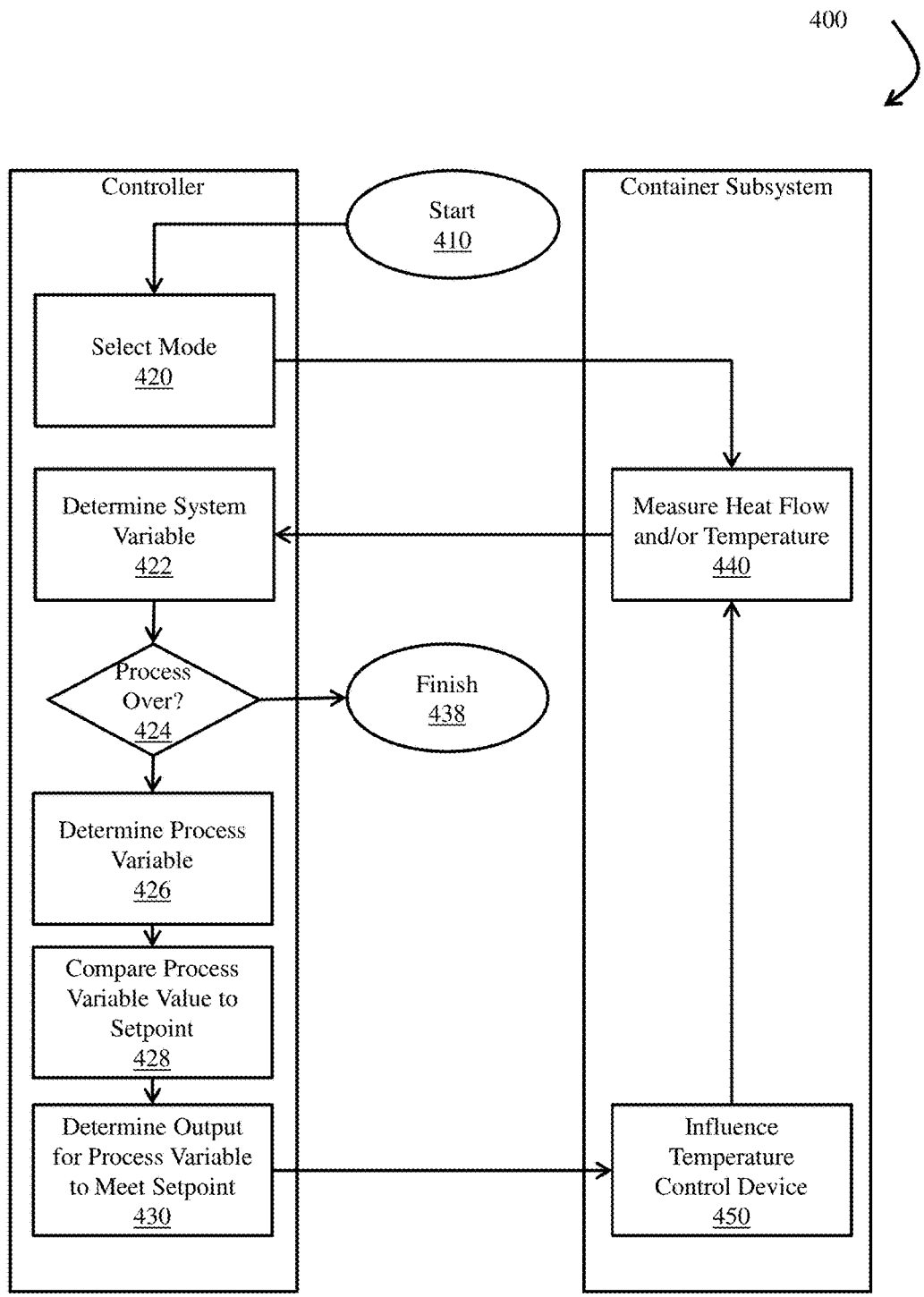
FIG. 4 shows a process diagram illustrating the general concepts of one example embodiment of methods of using one embodiment of the thermal energy measuring system.

For purposes of illustrating the operation of one embodiment of a thermal energy measuring system, and not for limitation, the operation of a thermal energy measurement assembly consistent with the embodiment of FIG. 1 is summarized in FIG. 4.

In one embodiment, methods of measuring the temperature of a reaction generally comprise selecting one of a first mode or second mode of operation for a thermal energy measuring system, if the first mode of operation is selected, then determining the temperature of the reaction from a temperature value over a first time period utilizing a first closed loop process and if the second mode of operation is selected, then determining the temperature of the reaction from a heat flow value over a second time period utilizing a second closed loop process.

In some embodiments, the first closed loop process comprises (a) measuring a heat flow to determine a heat flow value as a first process variable, (b) comparing the first process variable to a first setpoint, (c) influencing a temperature control device whereby the first process variable complies with the first setpoint, (d) measuring a temperature to determine temperature value, (e) iterating the steps of (a) through (d) over a first time period and (f) determining the temperature of the reaction from the temperature value over the first time period. For example, in this mode, the thermal energy measurement system functions as an isothermal calorimeter where the process variable is the sample temperature value (as measured by the temperature sensor) the setpoint is the setpoint temperature or predetermined sample container temperature, and the controller output is the magnitude of electrical current that is to be delivered to the heating/cooling module, e.g. TEM.

In some embodiments, the second closed loop process comprises (g) measuring a temperature to determine a temperature value as a second process variable, (h) comparing the second process variable to a second setpoint, (i)

influencing a temperature control device whereby the second process variable complies with the second setpoint, (j) measuring a heat flow to determine a heat flow value, (k) iterating the steps of (g) through (j) over a second time period; and (l) determining the temperature of the reaction from the heat flow value over the second time period. For example, in this mode, the thermal energy measurement system functions as an adiabatic calorimeter where the process variable is measured heat flow, the setpoint is zero and the controller output is the magnitude of electrical current that is to be delivered to the heating/cooling module, e.g. TEM.

FIG. 4 illustrates the operation of an example embodiment illustrating the steps generally preformed by different parts of the thermal energy measurement system. In this embodiment, the steps are generally separated by those steps followed by the controller and those steps performed by the container subsystem. The container subsystem is generally the physical containers with their elements (elements X in FIG. 1) and the controller subsystem is generally the DAQ and the controller (elements Y in FIG. 1). Referring to FIG. 4, the process 400 starts at 410 and the user selects the mode of operation at 420. At some time prior to measuring the heat flow or temperature, the sample is placed in the sample container, the lid is placed closing the sample container cavity and the process variable and the setpoints are defined. The temperature values or heat flow values are measured at step 440 and these values are communicated to the controller. At step 422, the controller determines the system variable from the values received by the container subsystem. For example, when the thermal energy measurement system operates in isothermal mode the heat flow value is the system variable used to determine the thermal energy of the sample and the when the system operates in an adiabatic mode, the temperature value is the system variable used to determine the thermal energy of the sample. At any point of the process, a check may be made to determine when to end the process. Here, after the system variable is determined, a check is made at 424 to see if the time limit of the process has been reached. If the process is over, the process completes at the finish 438. If the process is not over, the process proceeds to determine the process variable at 426. The process variable is used by the controller to determine the control output. For example, when the thermal energy measurement system operates in isothermal mode the temperature value is the process variable used to determine the control output and the when the system operates in an adiabatic mode, the heat flow value is the process variable used to determine the control output. At step 428, the process variable value is compared to the setpoint and at 430 the controller determines the control output to ensure the process variable meets the setpoint. The control output is communicated to the container subsystem and the control output influences the temperature control device at 450 to ensure the process variable meets the setpoint. At step 440, the heat flow and temperature are measured and communicated with the controller to iterate through the steps of 422, 424, 426, 428, 430 and 450 until the process is over.

One example embodiment of the thermal energy measurement system in isothermal mode may further illustrate steps 428, 430 and 450. In this embodiment, at step 428, the sample temperature value as measured by the temperature sensor is compared to the setpoint temperature. As a result of this comparison, at step 430, an output is determined to have the sample temperature meet the set point temperature. At step 450, the output of step 430 influences the temperature control device to keep the sample temperature and temperature sensor at the setpoint temperature. As an example of the above steps, if the sample temperature is measured by the temperature sensor at a temperature before a reaction and this temperature is used as the setpoint. If the reaction starts and the temperature value of the sample and the sample container is twenty degrees higher than the setpoint, the output of the controller is a magnitude of electrical current to the temperature control device such that the temperature control device lowers the temperature of the outer container so that it cools the temperature sensor temperature to comply with the set point temperature. With this example, the temperature control device, such as a TEM, would have a current that would cool the TEM and the outer container to lower the temperature of the temperature sensor and the sample container to the setpoint. The thermal energy measure of the reaction is calculated by the system from heat flow measurements taken from the heat flow sensor.

Another example embodiment the thermal energy measurement system in adiabatic mode may further illustrate steps 428, 430 and 450. In this embodiment, at step 428, the heat flow value is compared to a setpoint of zero heat flow. As a result of this comparison, at step 430, an output is determined to have the heat flow value meet the set point of zero. At step 450, the output of step 430 influences the temperature control device to keep the heat flow at zero. As an example of the above steps, if the reaction starts and the temperature of the sample increases such that the heat flow is value is twenty degrees per hour from the sample container across the heat flow sensor to the outer container, the output of the controller is a magnitude of electrical current to the temperature control device such that the temperature control device raises the temperature of the outer container so that the heat flow across the heat flow sensor complies with the setpoint of zero. With this example, the temperature control device, such as a TEM, would have a current that would raise the TEM to higher temperature to offset the heat flow from the sample temperature. The thermal energy measure of the reaction is calculated by the system from temperature sensor.

Figure 5:
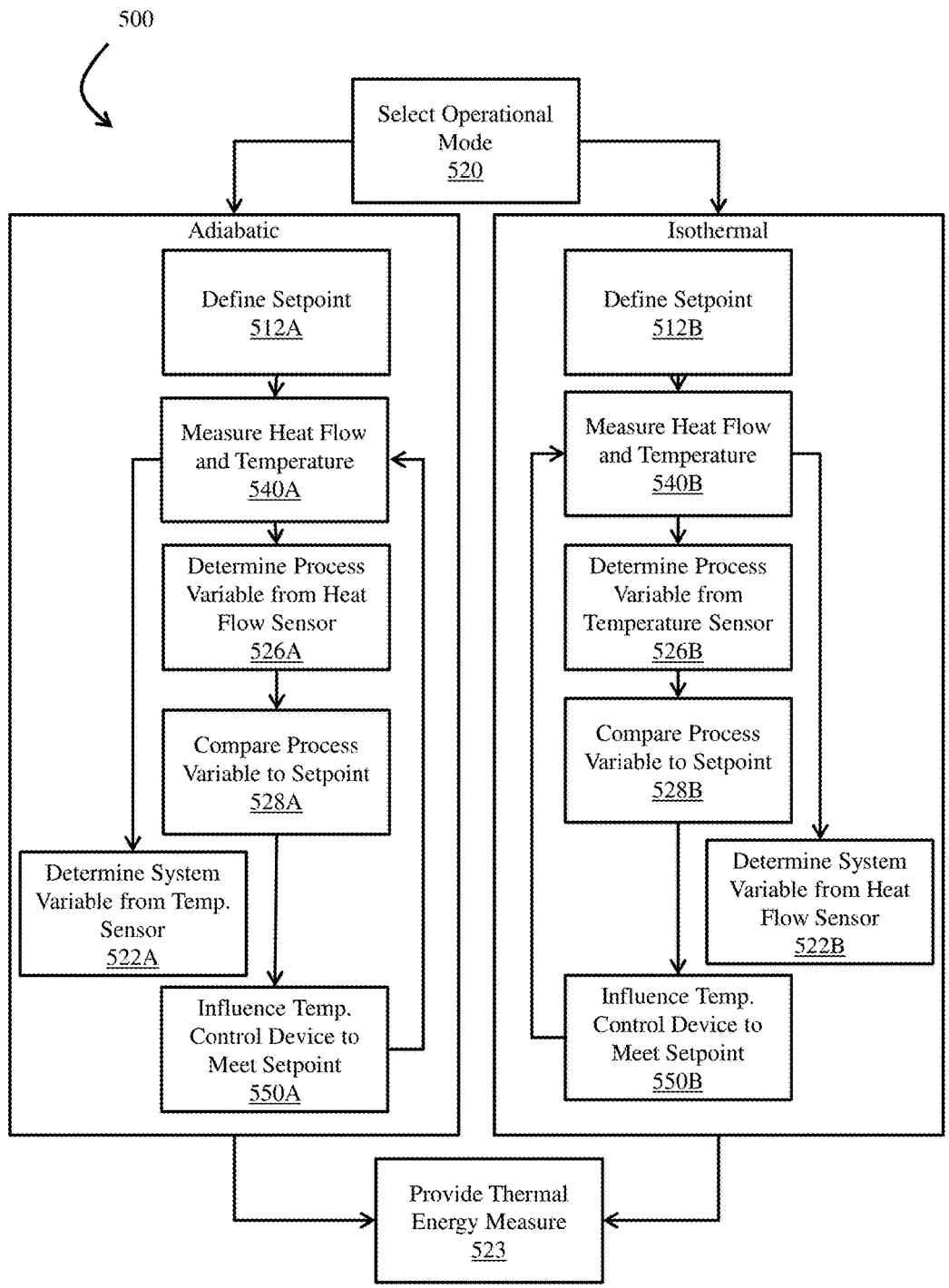
FIG. 5 shows a process diagram illustrating the general concepts of another example embodiment of methods of using one embodiment of the thermal energy measuring system in either an adiabatic mode or an isothermal mode.

FIG. 5 illustrates another embodiment of the thermal energy measurement system detailing the steps followed when the system operates in either an adiabatic mode or in an isothermal mode.

One Embodiment of Implementing the Methods in Software

One embodiment of the thermal energy measurement system generally comprises certain functional elements of FIGS. 4 and 5 in a software program product to be executed by a computer implemented system.

As will be readily apparent to those skilled in the art, thermal energy measurement systems and methods can be embodied in hardware, software, or a combination of hardware and software. For example, a computer system or server system, or other computer implemented apparatus combining hardware and software adapted for carrying out the methods described herein, may be suitable. One embodiment of a combination of hardware and software could be a general purpose computer system with a computer program that, when loaded and executed, carries out the respective methods described herein. In some embodiments, a specific use computer, containing specialized hardware for carrying out one or more of the instructions of the computer program, may be utilized. In some embodiments, the computer system may comprise a device such as, but not limited to a digital phone, cellular phone, laptop computer, desktop computer, digital assistant, server, server/client system or an embedded controller.

Computer program, software program, program, software or program code in the present context mean any expression, in any language, code or notation, of a set of instructions readable by a processor or computer system, intended to cause a system having an information processing capability to perform a particular function or bring about a certain result either directly or after either or both of the following: (a) conversion to another language, code or notation; and (b) reproduction in a different material form. A computer program can be written in any form of programming language, including compiled or interpreted languages, and it can be deployed in any form, including as a stand-alone program or as a module, component, subroutine, or other unit suitable for use in a computing environment.

Figure 6:
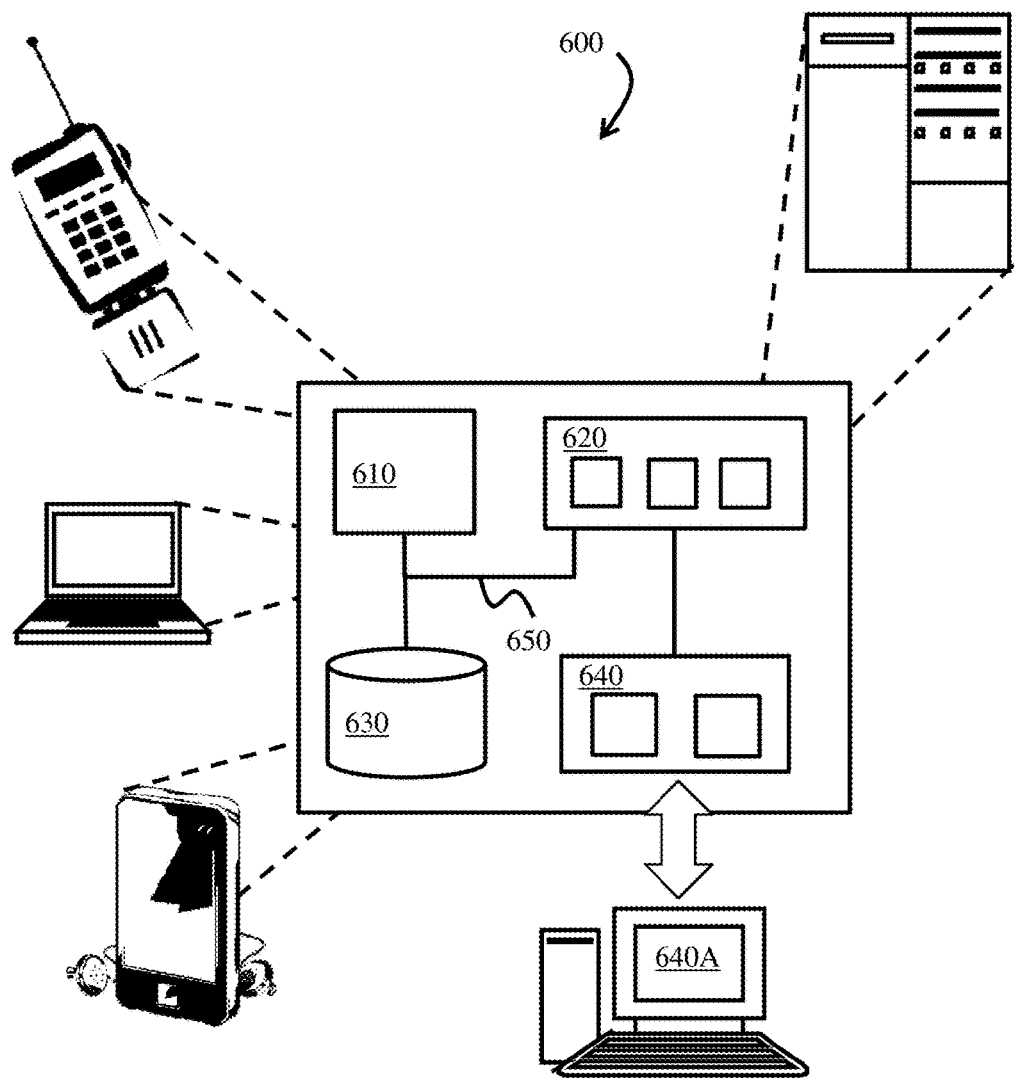
FIG. 6 illustrates one example embodiment of a computer system suitable for a thermal energy measurement system.

FIG. 6 is a schematic diagram of one embodiment of a computer system 600 by which the thermal energy measurement methods may be carried out. The computer system 600 can be used for the operations described in association with any of the computer implemented methods described herein. The computer system 600 includes at least one processor 610, a memory 620 and an input/output device 640. Each of the components 610, 620, and 640 may be operably coupled or interconnected using a system bus 650. The computer system 600 may further comprise a storage device 630 operably coupled or interconnected with the system bus 650.

The processor 610 is capable of receiving the instructions and/or data and processing the instructions of a computer program for execution within the computer system 600. In some embodiments, the processor 610 is a single-threaded processor. In some embodiments, the processor 610 is a multi-threaded processor. The processor 610 is capable of processing instructions of a computer stored in the memory 620 or on the storage device 630 to communicate information to the input/output device 640. Suitable processors for the execution of the computer program instruction include, by way of example, both general and special purpose microprocessors, and a sole processor or one of multiple processors of any kind of computer.

The memory 620 stores information within the computer system 600. Memory 620 may comprise a magnetic disk such as an internal hard disk or removable disk; a magneto-optical disk; an optical disk; or a semiconductor memory device such as PROM, EPROM, EEPROM or a flash memory device. In some embodiments, the memory 620 comprises a transitory or non-transitory computer readable medium. In some embodiments, the memory 620 is a volatile memory unit. In another embodiment, the memory 620 is a non-volatile memory unit.

The processor 610 and the memory 620 can be supplemented by, or incorporated in, ASICs (application-specific integrated circuits).

The storage device 630 may be capable of providing mass storage for the system 600. In various embodiments, the storage device 630 may be, for example only and not for limitation, a computer readable medium such as a floppy disk, a hard disk, an optical disk, a tape device, CD-ROM and DVD-ROM disks, a flash memory device alone or with a device to read the computer readable medium, or any other means known to the skilled artisan for providing the computer program to the computer system for execution thereby. In some embodiments, the storage device 630 comprises a transitory or non-transitory computer readable medium.

In some embodiments, the memory 620 and/or the storage device 630 may be located on a remote system such as a server system, coupled to the processor 610 via a network interface, such as an Ethernet interface.

The input/output device 640 provides input/output operations for the system 600 and may be in communication with a user interface 640A as shown. In one embodiment, the input/output device 640 includes a keyboard and/or pointing device. In some embodiments, the input/output device 640 includes a display unit for displaying graphical user interfaces or the input/output device 640 may comprise a touchscreen. In some embodiments, the user interface 640A comprises devices such as, but not limited to a keyboard, pointing device, display device or a touchscreen that provides a user with the ability to communicate with the input/output device 640.

The computer system 600 can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, wireless phone networks and the computers and networks forming the Internet.

One example embodiment of the thermal energy measuring systems and methods of use may be embodied in a computer program product, the computer program product comprising a computer readable medium having a computer readable program code tangibly embodied therewith, the computer program code configured to implement the methods described herein, and which, when loaded in a computer system comprising a processor, is able to carry out these methods.

FIG. 2B, as described above, illustrates a functional diagram of one embodiment of a computer implemented controller.

Although this invention has been described in the above forms with a certain degree of particularity, it is understood that the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention which is defined in the claims and their equivalents.

What is claimed is:

1. A thermal energy measuring system comprising:
a sample container configured to retain a sample;
the sample container having a sample container temperature;
the sample container generally contained within an outer container;
a heat flow sensor configured to measure a heat flow value of a heat flow between the sample container and the outer container;
a temperature sensor configured to measure a sample container temperature value;
a temperature control device configured to control a temperature of the outer container to an outer container temperature value whereby the temperature control device is capable of influencing the heat flow between the sample container and the outer container to a predetermined heat flow value;

the temperature control device configured to control a temperature of the outer container to an outer container temperature value whereby the temperature control device is capable of influencing the sample container temperature to a predetermined temperature value;

the sample container and the outer container each form generally open ended coaxial cylinders each having open ends, sidewalls, a common longitudinal axis and a radius;

the sample container sidewalls and the outer container sidewalls comprise a highly thermally conductive material;

the thermal energy measuring system further comprises a semi-insulating layer between the sample container sidewalls and the outer container sidewalls;

the semi-insulating layer comprises a material having a thermal conductivity less than the highly thermally conductive material of the sample container sidewalls and the outer container sidewalls; and the open ends of the sample container sidewalls and the outer container sidewalls are covered with a thermally insulating bottom and a thermally insulating lid whereby the heat flow along the common longitudinal axis each of the containers is reduced, a sidewall temperature is constant along each of the container sidewalls coaxial with each of the containers and that the heat flow occurs primarily in a radial direction perpendicular to the common longitudinal axis.

2. The thermal energy measuring system of claim 1 wherein the temperature control device is a thermoelectric module (TEM).

3. The thermal energy measuring system of claim 1 wherein the temperature control device is a thermoelectric module (TEM) configured to control the temperature of the outer container to a higher temperature than a current temperature or to heat the outer container to a lower temperature than the current temperature.

4. The thermal energy measuring system of claim 1 wherein the temperature control device is in contact with the outer container.

5. The thermal energy measuring system of claim 1 wherein the temperature control device is configured to control the temperature of the outer container based on the predetermined heat flow value or the predetermined temperature value.

6. The thermal energy measuring system of claim 1 wherein:
the temperature control device is a thermoelectric module (TEM); and
the temperature control device is capable of being selectively influenced by a closed loop servo controller whereby the heat flow value is capable of being maintained at a setpoint and whereby the sample container temperature value is capable of being maintained at a second setpoint.

7. The thermal energy measuring system of claim 6 wherein:
the temperature control device is capable of being influenced according to a predefined environmental temperature profile at the sample container;
the closed loop servo controller is configured to input a magnitude of electrical current through the TEM; and
the magnitude of electrical current representing the predefined environmental temperature profile defined by a control system using a control algorithm.

8. The thermal energy measuring system of claim 6 wherein:
the temperature control device is capable of being influenced according to a predefined environmental heat flow profile at the heat flow sensor;
the closed loop servo controller is configured to input a magnitude of electrical current through the TEM; and
the magnitude of electrical current representing the predefined environmental heat flow profile defined by a control system using a control algorithm.

9. A thermal energy measuring system of claim 1 wherein:
the temperature control device is a thermoelectric module (TEM);
the temperature control device is capable of being influenced by a closed loop servo controller wherein the heat flow value is a first process variable, the predetermined heat flow value is a first setpoint and an output current of the closed loop servo controller is a controller output whereby the heat flow value is capable of being maintained at the first setpoint and a sample temperature value is provided by the temperature sensor; and
the temperature control device is also capable of being influenced by the closed loop servo controller wherein the sample container temperature value is a second process variable, the predetermined temperature value of the sample container temperature is a second setpoint and the output current of the closed loop servo controller is the controller output whereby the sample container temperature value is capable of being maintained at the second setpoint and the heat flow value is provided by the heat flow sensor.

10. The thermal energy measuring system of claim 1 further comprising a logger configured to log all measured and controlled parameters.

11. The thermal energy measuring system of claim 1 wherein the heat flow sensor comprises a thermopile.

12. The thermal energy measuring system of claim 1 wherein the heat flow sensor comprises pairs of thermocouples connected in a thermopile arrangement with odd-numbered thermocouples in thermal contact with the sample container and even-numbered thermocouples in thermal contact with the outer container.

13. The thermal energy measuring system of claim 1 wherein the heat flow sensor is embedded into the semi-insulating layer between the sample container and the outer container.

14. The thermal energy measuring system of claim 1 wherein:
the heat flow sensor is embedded into the semi-insulating layer between the sample container and the outer container; and
a thermal conductivity of the heat flow sensor and a thermal conductivity of the semi-insulating layer are about equal.

15. The thermal energy measuring system of claim 1 wherein the temperature sensor is in thermal contact with the sample container.

16. The thermal energy measuring system of claim 1 wherein the predetermined heat flow value is about 0.

17. A thermal energy measuring system comprising:
a sample container configured to retain a sample;
the sample container having a sample container temperature;
the sample container generally contained within an outer container;
a heat flow sensor configured to measure a heat flow value of a heat flow between the sample container and the outer container;

a temperature sensor configured to measure a sample container temperature value;
a temperature control device configured to control a temperature of the outer container to an outer container temperature value whereby the temperature control device is capable of influencing the heat flow between the sample container and the outer container to a predetermined heat flow value;
the temperature control device configured to control a temperature of the outer container to an outer container temperature value whereby the temperature control device is capable of influencing the sample container temperature to a predetermined temperature value;
the sample container comprises a curved outer wall surrounding atop sample container sidewall and a bottom sample container sidewall;
the outer container comprises a top outer container sidewall and a bottom outer container sidewall;
a semi-insulating layer comprises a top semi-insulating disk positioned between the top sample container sidewall and the top outer container sidewall;
the semi-insulating layer further comprises a bottom semi-insulating disk positioned between the bottom sample container sidewall and the bottom outer container sidewall; and
an outside surface of the top and the bottom outer container sidewalls and the curved surfaces of the sample container, the semi-insulating layer and the outer container are terminated with a thermally insulating material whereby the heat flow along a radius of the sample container, the top and the bottom semi-insulating disks and the top and the bottom outer container sidewalls is minimized and the temperature of the sample container sidewalls is constant along an imaginary cross-section of the sample container sidewalls perpendicular to a longitudinal axis and the heat flow primarily occurs in an axial direction of the sample container, the top and the bottom semi-insulating disks and the top and the bottom outer container sidewalls.

18. The thermal energy measuring system of claim 17 wherein the temperature control device is a thermoelectric module (TEM).

19. The thermal energy measuring system of claim 17 wherein the temperature control device is a thermoelectric module (TEM) configured to control the temperature of the outer container to a higher temperature than a current temperature or to heat the outer container to a lower temperature than the current temperature.

20. The thermal energy measuring system of claim 17 wherein the temperature control device is in contact with the outer container.

21. The thermal energy measuring system of claim 17 wherein the temperature control device is configured to control the temperature of the outer container based on the predetermined heat flow value or the predetermined temperature value.

22. The thermal energy measuring system of claim 17 wherein:
the temperature control device is a thermoelectric module (TEM); and
the temperature control device is capable of being selectively influenced by a closed loop servo controller whereby the heat flow value is capable of being maintained at a setpoint and whereby the sample container temperature value is capable of being maintained at a second setpoint.

23. The thermal energy measuring system of claim 22 wherein:
the temperature control device is capable of being influenced according to a predefined environmental temperature profile at the sample container;
the closed loop servo controller is configured to input a magnitude of electrical current through the TEM; and
the magnitude of electrical current representing the predefined environmental temperature profile defined by a control system using a control algorithm.

24. The thermal energy measuring system of claim 22 wherein:
the temperature control device is capable of being influenced according to a predefined environmental heat flow profile at the heat flow sensor;
the closed loop servo controller is configured to input a magnitude of electrical current through the TEM; and
the magnitude of electrical current representing the predefined environmental heat flow profile defined by a control system using a control algorithm.

25. The thermal energy measuring system of claim 17 wherein:
the temperature control device is a thermoelectric module (TEM);
the temperature control device is capable of being influenced by a closed loop servo controller wherein the heat flow value is a first process variable, the predetermined heat flow value is a first setpoint and an output current of the closed loop servo controller is a controller output whereby the heat flow value is capable of being maintained at the first setpoint and a sample temperature value is provided by the temperature sensor; and
the temperature control device is also capable of being influenced by the closed loop servo controller wherein the sample container temperature value is a second process variable, the predetermined temperature value of the sample container temperature is a second setpoint and the output current of the closed loop servo controller is the controller output whereby the sample container temperature value is capable of being maintained at the second setpoint and the heat flow value is provided by the heat flow sensor.

26. The thermal energy measuring system of claim 17 further comprising a logger configured to log all measured and controlled parameters.

27. The thermal energy measuring system of claim 17 wherein the heat flow sensor comprises a thermopile.

28. The thermal energy measuring system of claim 17 wherein the heat flow sensor comprises pairs of thermocouples connected in a thermopile arrangement with odd-numbered thermocouples in thermal contact with the sample container and even-numbered thermocouples in thermal contact with the outer container.

29. The thermal energy measuring system of claim 17 wherein the heat flow sensor is embedded into the semi-insulating layer between the sample container and the outer container.

30. The thermal energy measuring system of claim 17 wherein:
the heat flow sensor is embedded into the semi-insulating layer between the sample container and the outer container; and
a thermal conductivity of the heat flow sensor and a thermal conductivity of the semi-insulating layer are about equal.

31. The thermal energy measuring system of claim 17 wherein the temperature sensor is in thermal contact with the sample container.

32. The thermal energy measuring system of claim 17 wherein the predetermined heat flow value is about 0.5

* * * * *